United States Patent

[11] 3,552,430

| [72] | Inventor | John J. Love |
| | | St. Louis, Mo. |
| [21] | Appl. No. | 822,576 |
| [22] | Filed | May 7, 1969 |
| [45] | Patented | Jan. 5, 1971 |
| [73] | Assignee | Emerson Electric Co. |
| | | St. Louis, Mo. |
| | | a corporation of Missouri |

[54] STEPPED OPENING DIAPHRAGM GAS VALVE
5 Claims, 1 Drawing Fig.

[52] U.S. Cl. .................................................. 137/495
[51] Int. Cl. .................................................. F16k 17/10, F16k 31/42
[50] Field of Search .................................. 137/495, 494; 251/29, 61

[56] References Cited
UNITED STATES PATENTS

| 3,135,281 | 6/1964 | Morgan | 137/494X |
| 3,300,174 | 1/1967 | Urban et al. | 251/29 |
| 3,386,467 | 6/1968 | Katchka | 137/495 |
| 3,414,010 | 12/1968 | Sparrow | 137/495 |
| 3,502,101 | 3/1970 | Willson et al. | 137/495 |

Primary Examiner—M. Cary Nelson
Assistant Examiner—Robert J. Miller
Attorney—Charles E. Markham ABSTRACT: A biased closed, fluid pressure operated gas valve in which supply line pressure is applied to both sides of the valve actuator to hold the valve closed and in which line pressure is bled off from one side of the actuator under control of two, parallel connected, pressure regulators, one of which permits bleed off at a rate which effects an initial opening step of the valve and the other of which includes time delay means and permits, after a delay, a greater bleedoff rate, thereby effecting a second opening step of the valve.

PATENTED JAN 5 1971
3,552,430
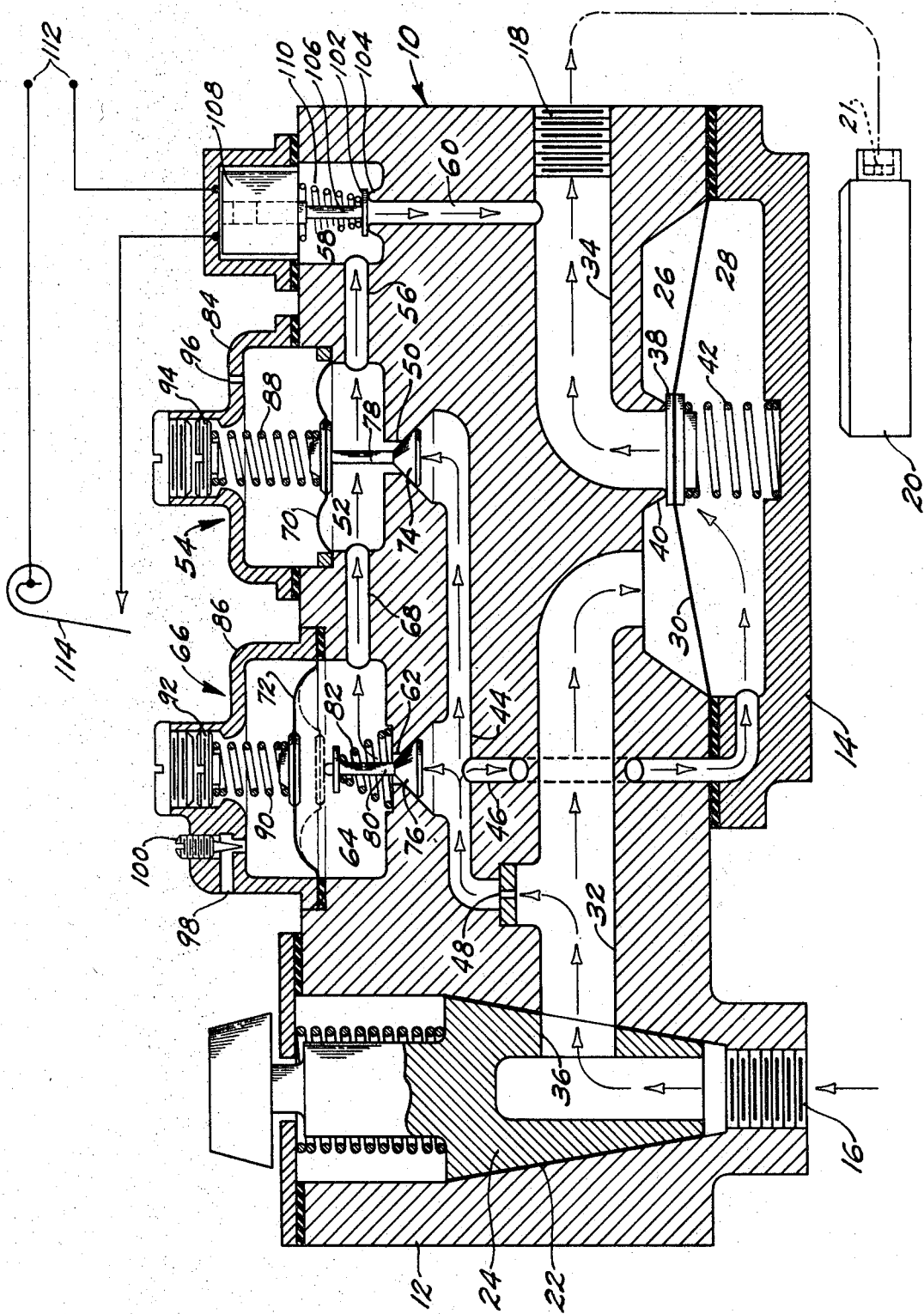
INVENTOR
JOHN J. LOVE
BY Charles E. Markham
HIS AGENT

STEPPED OPENING DIAPHRAGM GAS VALVE

This invention relates to gas valves for controlling the flow of gas to gas burners and particularly to fluid pressure operated gas valves which include means to effect a stepped opening operation of the valve.

A gas valve of this kind is shown and described in U.S. Pat. No. 3,300,174, issued Jan. 24, 1967, to Donald C. Urban et al. This patent shows a biased closed, diaphragm actuated valve in which supply line pressure is applied to both sides of the diaphragm and in which two series arranged pressure regulators in a bleedoff passage leading from one side of the diaphragm are operative to effect a stepped opening operation of the valve. In this arrangement, a first pressure regulator is adjusted so as to permit only sufficient bleed off to effect an initial, partial opening of the valve and a second, series connected, pressure regulator is adjusted so as to permit a sufficiently greater bleedoff rate to result in a second opening step of the valve. Control is shifted from the first to second pressure regulator by a pressure responsive actuator, including time delay means which after a short delay renders the first pressure regulator inoperative.

The present invention has for an object the provision of a generally new and simplified arrangement for effecting the stepped opening operation of a biased closed, fluid pressure operated gas valve.

A further object is to provide a novel arrangement for effecting the stepped opening operation of a biased closed, fluid pressure operated valve in which supply line pressure is applied to both sides of the valve actuator and is bled off from one side thereof at a higher rate than it is being applied thereto through a bleedoff passage controlled by two, parallel connected, pressure regulators. One of the pressure regulators is adjusted to permit a bleedoff rate which effects an initial opening step of the valve, and the other is adjusted to permit a greater bleedoff rate to effect a second valve opening step and includes time delay means to delay its operation.

Other objects and advantages will appear from the following description when read in connection with the accompanying drawing.

The single FIG. of the drawing is a cross-sectional view of a valve device constructed in accordance with the present invention, and is shown in association with a schematically illustrated gas burner.

Referring to the drawing, the device has a valve body 10 comprising a main section 12 and a lower section 14 suitably attached to the main section. The main body section 12 is provided with an inlet 16 entering from the lower side thereof, which is screw threaded for attachment therein of a supply conduit, and an outlet 18 in the right side thereof, which is screw threaded for attachment of a conduit leading to a gas burner 20 having a metering orifice 21.

A tapered bore 22 concentric with inlet 16 and entering from the upper side of body section 12 receives a hollow, rotary, plug cock 24. The main and lower body sections 12 and 14 are provided with opposed recesses forming upper and lower chambers 26 and 28, respectively, separated by a flexible diaphragm member 30. The upper chamber 26 is connected to the tapered bore 22 by a main inlet passage 32, and the chamber 26 is connected to the outlet 18 by a main outlet passage 34. The hollow plug cock 24 has a port 36 in the wall thereof which completes communication between the inlet 16 and chamber 26 when the plug cock is rotated to the open position shown, wherein the port 36 is in registry with the inlet passage 32.

A main disc valve 38, attached to the central portion of flexible diaphragm member 30, cooperates with a valve seat 40 formed around the end of outlet passage 34 in chamber 26, thereby to control the flow from chamber 26 to the outlet 18. The valve 38 is biased in a closed position on its seat 40 by a spring 42.

Communication between inlet passage 32 and lower chamber 28 is provided by passages 44 and 46. This communication is, however, limited by a calibrated restricting orifice 48. Communication between lower chamber 28 and main outlet passage 34 is also provided and comprises the passage 46, passage 44, a port 50 opening into the chamber 52 of a pressure regulator 54, a passage 56, a valve chamber 58, and a passage 60. Communication is also provided between main valve chamber 28 and main outlet passage 34 bypassing the port 50 of pressure regulator 54. This communication comprises a port 62 leading from passage 44 to the chamber 64 of a second pressure regulator 66 and a passage 68 leading from the pressure regulator chamber 64 to the pressure regulator chamber 52.

The chambers 52 and 64 of pressure regulators 54 and 66 are formed as recesses in the upper surface of main body section 12 which are enclosed by flexible diaphragm members 70 and 72 respectively. The pressure regulator ports 50 and 62 are controlled by valves 74 and 76 respectively. The valve 74 of pressure regulator 54 is connected by a valve stem 78 to the central portion of diaphragm member 70. The valve 76 of pressure regulator 66 is not, however, connected to diaphragm 72, but has a free upstanding valve stem 80 and is biased closed on its seat by a spring 82 which bears against the bottom of chamber 64 and against a collar fixed on valve stem 80 near its upper end.

The pressure regulators 54 and 56 further include domelike cover members 84 and 86, respectively, suitably attached to the body section. The diaphragm members 70 and 72 are biased downward by springs 88 and 90 respectively. Both springs 88 and 90 bear at their lower ends against the central portion of their respective diaphragm and at their upper ends against adjustment screws 92 and 94 respectively. The screws 92 and 94 are threadedly engaged in upper, internally threaded, neck portions of the cover members 84 and 86. The chambers formed in the domed cover members 84 and 86, above the diaphragms, are vented to atmosphere by vents 96 and 98. Vent 98 in the cover of pressure regulator 66 is provided with a screw threaded adjusting member 100 having a tapered valve portion extending into vent 98 to provide a fine adjustment of the effective area of this vent.

The valve chamber 58 connecting the ends of passages 56 and 60 has a valve 102 therein cooperating with a seat 104 surrounding the end of passage 60. The valve 102 is connected by a stem 106 to the plunger of a solenoid 108 and is biased closed on its seat 104 by a spring 110. The solenoid 108, when energized, opens valve 102. The solenoid is energized through a circuit which includes electrical power source terminals 112 and a thermostatic switch 114. The thermostatic switch is responsive to the temperature of a body or space heated by the gas burner 20.

OPERATION

The device is shown in an "off" or closed position with the thermostatic switch 114 open and the valve 102 closed. The hollow, rotary, plug cock 24 is, however, in an open position, with its port 36 in registry with main inlet passage 32.

When these elements of the device are in these positions, full supply line pressure is applied to both sides of diaphragm 30 and to the undersides of diaphragms 70 and 72 of the pressure regulators. This permits spring 42 to bias main valve 38 closed on its seat 40. The greater area on the lower side of diaphragm 30, exposed to this line pressure when valve 38 is tightly closed on its seat, acts to supplement the force of spring 42 in holding valve 38 tightly on its seat. This line pressure on the lower side of diaphragm 70 of pressure regulator 54 causes the attached regulator valve 74 to close. This pressure also causes the diaphragm 72 of pressure regulator 66 to be forced upward against the force of spring 90 to a fully, upwardly extended position in which its central portion is spaced from the upper end of valve stem 80, as indicated in full line in the drawing, thereby permitting spring 82 to bias regulator valve 76 closed.

When, under these conditions, the thermostatic switch 114 closes in response to a temperature drop in the space being heated by burner 20, it effects the energization of solenoid 108 and, consequently, the opening of the valve 102. When valve 102 opens a pressure drop occurs in the pressure regulator chamber 52, which permits spring 88 of pressure regulator 54 to open the attached valve 74 an amount predetermined by the adjustment of spring 88. This predetermined opening of regulator valve 74 results in a bleed off of pressure from valve chamber 28, at a sufficiently greater rate than can be maintained through orifice 48, to permit the line pressure being applied above diaphragm 30 to open main valve 38 a predetermined amount, which constitutes the initial opening step of valve 38. This predetermined initial opening step of valve 38 supplies sufficient gas to burner 20 to insure good ignition, but it also limits the flow to preclude flame roll out and provide quiet ignition.

The opening of valve 102 also effects a simultaneous drop in pressure in chamber 64 of pressure regulator 66 through passage 68, thereby permitting spring 90 to start moving the central portion of diaphragm 72 downward. This downward movement of diaphragm 72 does not, however, immediately effect the opening of regulator valve 76, due to the fact that the central portion of diaphragm 72 has been moved upward a substantial distance above the upper end of valve stem 80 by line pressure prior to the opening of valve 102. When the central portion of diaphragm 72 moves downward sufficiently to engage valve stem 80, as indicated in dotted line, and further downward to open valve 76, the bleedoff rate will be considerably increased. The spring 90 of pressure regulator 66 is adjusted so as to permit a greater flow to pass its valve 76 than the adjustment of regulator spring 88 will permit to pass its valve 74.

This increased bleedoff rate now effects a further pressure drop in chamber 28 and permits the line pressure being applied above diaphragm 30 to further open the main valve 38. This further opening movement of valve 38 constitutes a second step in the opening movement of the valve. The time interval required for regulator spring 90 to move the central portion of regulator diaphragm 72 downward into contact with the upper end of valve stem 80, and to move the valve 76 open, provides a delay between the initial and second opening steps of valve 38 during which the air draft generated by ignition of the initial gas supply may provide sufficient additional oxygen to support a greater supply of fuel. The delay between the initial and second opening steps of valve 38 may be varied by variably restricting the vent 98 to atmosphere with the screw-threaded, adjustable, needle valve 100.

It will be understood that pressure regulator 54 may be dispensed with and a fixed or adjustable restriction of port 50 may be substituted therefor when the supply line pressure is sufficiently constant or the flow of the initial step is made quite low with respect to the second flow step.

I claim:

1. In a stepped opening, fluid, pressure operated, gas valve, a valve body having an inlet, an outlet, and a main passageway connecting said inlet and outlet, a biased closed main valve controlling the flow through said passageway including a fluid pressure responsive actuator operative to move said valve openward when the fluid pressure is sufficiently higher on one side thereof than on the other, means providing communication between said inlet and said one side of said actuator, means providing relatively restricted communication between said inlet and said other side of said actuator, a bleed passage extending from said other side of said actuator to an area of relatively low pressure, a control valve in said bleed passage movable to open and close said bleed passage, flow limiting means in said bleed passage upstream from said control valve operative to limit the bleedoff rate when said control valve is open to that which will effect a predetermined partial opening of said main valve, a bypass passage around said flow limiting means, a pressure regulator valve controlling said bypass passage and which when operative permits a greater bleedoff rate and effects a further opening of said main valve, resilient means biasing said regulator valve closed, stronger opposed resilient means capable of opening said regulator valve when operatively connected thereto, fluid pressure responsive means operating between atmosphere and the pressure in said bleed passage when said control valve is closed to flex and space said stronger resilient means from operative connection with said regulator valve, and said fluid pressure responsive means having restricted communication with the atmosphere, thereby to delay its response to the pressure drop in said bleed passage to permit initial opening of said regulator valve following the opening of said control valve whereby a second greater flow step due to further opening of said main valve is delayed.

2. A gas valve as set forth in claim 1 in which the said bleed passage extends from said other side of said actuator to said main passageway to a point downstream from said main valve.

3. A gas valve as set forth in claim 1 in which said flow limiting means in said bleed passage comprises a biased open pressure regulator valve, including a pressure responsive actuator operating between the pressure in said bleed passage and atmospheric pressure to limit the flow through said bleed passage to that which will effect a partial opening of the main valve, resulting in a predetermined initial flow step.

4. A gas valve as set forth in claim 1 in which means to variably restrict the communication between said fluid pressure responsive means and the atmosphere is provided.

5. A gas valve as set forth in claim 1 in which said stronger, opposed, resilient means comprises a compression spring, which when operatively connected to said pressure regulator valve is compressed between said valve and a screw-threaded adjustment member whereby the valve opening biasing force thereof may be varied.